2,935,517

ALKALI REFINING OF EPOXY PLASTICIZERS

Ralph J. Gall, Kenmore, Frank P. Greenspan, Larchmont, and Mary C. Daly, New York, N.Y., assignors to Food Machinery and Chemical Corporation, San Jose, Calif.

No Drawing. Application December 16, 1957
Serial No. 702,790

7 Claims. (Cl. 260—348)

This invention relates to the stabilization of epoxy-containing fatty ester plasticizers, and particularly to the stabilization against degradation of such plasticizers which have been prepared by the epoxidation of higher unsaturated fatty esters with peracetic acid formed in situ in the presence of sulfuric acid.

It is known that epoxy-containing fatty esters are useful plasticizers and stabilizers, hereinafter referred to as plasticizers, for chlorine-containing polyvinyl resins. By reason of the epoxy oxygen in these ester derivatives, they exhibit excellent compatibility with the resins and furthermore they effectively stabilize the resins against degradation.

The preferred method of preparing these plasticizers is taught and claimed in U.S. Patent No. 2,801,253, in the names of Frank P. Greenspan and Ralph J. Gall. According to this preferred method the plasticizer is prepared by epoxidizing higher unsaturated fatty esters with peracetic acid formed in the presence of the ester from acetic acid, hydrogen peroxide, and sulfuric acid.

Plasticizers prepared according to this preferred method have met with wide adoption in the compounding of various polyvinyl resins. They have been found to impart to the resins high degrees of flexibility and drape, and resistance to degradation by light and commonly encountered, moderately high temperatures. However, universal acceptance of these plasticizers has been retarded for the reason that they have been found to undergo degradation, e.g. loss of epoxy oxygen, discoloration and, in some instances viscosity increase, upon exposure to elevated temperatures for extended periods of time, for example to 165° C. for 16 hours.

It is probable that this affect of high temperatures on the plasticizer is due to formation of adducts of the agent and the sulfuric acid. It has been found in this connection that acetic acid may be replaced in the described epoxidation process by other aliphatic carboxylic acids, without avoiding the formation of degradation-susceptible epoxy containing plasticizers. Irrespective of the mechanism, however, the described degradation is known to occur only with those epoxidized fatty esters which are prepared by a sulfuric acid catalyzed, in situ epoxidation process.

It has been attempted previously to stabilize epoxy plasticizers of the present type by treating them with aqueous solutions of various alkalies, e.g. sodium hydroxide or potassium hydroxide, in order to destroy the sulfuric acid adducts which are believed to catalyze the degradation. However, such attempts have been unsuccessful. Accordingly, the epoxidized ester plasticizers prepared by the method of the cited patent have been excluded from use in certain important applications which require a plasticizer having resistance to elevated temperatures for extended periods.

It is a feature of this invention to provide a method of stabilizing epoxy-containing fatty ester plasticizers which have been prepared by the in situ peracetic acid technique. It is a further feature to provide a method of effecting such stabilization by a simple, inexpensive pretreatment of the plasticizer, and without addition of external stabilizers.

In accordance with the method of this invention an epoxidized fatty ester plasticizer, which has been prepared by epoxidation of a higher unsaturated fatty ester with peracetic acid formed in situ from hydrogen peroxide, acetic acid and sulfuric acid in the presence of the ester, is treated with a solid, particulate alkali.

The treatment comprises mixing the plasticizer with about 1–5% by weight of this agent of the particulate alkali, and heating the resulting mixture for about ½ to 2 hours at a temperature of about 30° to 100° C. This treatment preferably is carried out with agitation, and if desired in the presence of a liquid which is either a solvent or a diluent for the plasticizer, but which is a non-solvent for the alkali. It is important that the treatment be effected in the substantial absence of water, such that the alkali remains in a solid, particulate form, and is neither dissolved, nor caused to lose its particulate form by reason of agglomeration of the particles.

It has been found surprisingly that although the treatment of the plasticizer with aqueous solutions of alkalies is substantially ineffective in stabilizing the agent against degradation upon extended exposure to elevated temperatures, the same treatment carried out in the substantial absence of water is highly efficient in such stabilization. Thus it has been found that plasticizers of the herein type treated according to the method of this invention are highly resistant to loss of oxirane oxygen, discoloration and viscosity increase even upon exposure to temperatures on the order of 165° C. four times in the neighborhood of 16 hours.

The epoxidized ester plasticizers treated according to the present method are the epoxidized fatty esters prepared according to the method of U.S. Patent No. 2,801,253, cited above. These materials are prepared by epoxidizing an ester of an unsaturated higher fatty acid with peracetic acid formed, in the presence of the ester, from acetic acid and hydrogen peroxide. According to this process sulfuric acid is employed as the catalyst for formation of the peracetic acid, and accordingly is present in the in situ reaction mixture.

Typical higher unsaturated fatty acid esters useful in preparing the plasticizers are those which are formed from the following fatty acids: myristoleic, palmitoleic, oleic, linoleic, elaeostearic, liconic, ricinoleic, erucic, porinoric, arochidonic, clupanodonic. The straight or branched chain aliphatic hydroxy compounds are used to form the present esters with these fatty acids. The exact nature of the esterifying aliphatic hydroxy compound is not critical, the epoxidation reaction being directed to unsaturation in the fatty acid moiety of the ester.

The epoxidation is carried out by adding the acetic acid and sulfuric acid to the ester with stirring, thereafter adding the hydrogen peroxide to the mixture, and heating the resulting reaction mixture at about 60°–110° C. until the epoxidation has been effected. The acetic acid is employed in the amount of about 0.25 to 1.0 moles, and the hydrogen peroxide to the extent of about 1 mole per mole of ethylenic unsaturation to be reacted in the ester. The sulfuric acid is employed to the extent of about 0.5 to 5% of the combined weight of acetic acid and hydrogen peroxide.

The alkali employed in carrying out the present stabilization is an alkali metal or alkaline earth metal hydroxide from the group consisting of the hydroxides of sodium, potassium, calcium, and barium.

The alkali is employed to the extent of about ½–5% by weight of the plasticizer to be stabilized. It is apparent that if the plasticizer contains an appreciable amount of free acid, due to insufficient purification following its manufacture, an additional amount of alkali should be introduced to neutralize it. It has been found that use of less than 1% of the alkali does not result in efficient stabilization, whereas use of more than about 5% thereof in addition to any amount required from neutralization of free acid present, is wasteful.

The particles of alkali should be in the form of flakes, such as those commercially available, or of pellets having a diameter of no greater than about 0.125″. This is in order that they will present sufficient surface to provide satisfactory stabilization activity. It will be apparent that use of excessively large pellets will have the effect of reducing the available surface, and therefore of increasing the amount of alkali required. On the other hand there is no limit, other than the practical one of availability, on the minimum size of the particles.

It is important that the alkali not be dissolved, and particularly that the stabilization process be operated in the substantial absence of water, in order that the alkali will not dissolve or be tackified, with resulting agglomeration of the alkali particles. In this regard, the system will tolerate an amount of water short of that which will dissolve or tackify the particles, for example in the case of sodium hydroxide about 30% of water on the weight of the hydroxide. Thus the term substantial absence of water means free of that amount of water which will tackify the alkali particles.

While the present system cannot tolerate amounts of water which will tackify the alkali particles, it is possible and even advantageous to employ a solvent or diluent for the plasticizer, provided such solvent or diluent does not substantially dissolve or tackify the alkali. The solvent or diluent must be an organic material which is unreactive with the ingredients of the reaction mixture. Typical organic materials which possess the required characteristics include the various aliphatic and cyclic hydrocarbons, as well as the water insoluble oxygenated and halogenated derivatives of these compounds.

The temperature at which the present treatment is effected is from about 30° to 100° C. When lower temperatures are used the stabilization treatment has been found to be incomplete, whereas use of more highly elevated temperatures presents a danger of destruction of the important epoxy oxygen groups in the plasticizer.

The time of the stabilization treatment will be from approximately ½ hour to 2 hours, with the length of the time period corresponding inversely to the temperature employed. Thus normally when temperatures near the upper end of the 30° to 100° C. range are employed, times approaching the ½ hour end of the time range can be employed whereas when temperatures nearer the lower end of the range are used the time of treatment should normally be near the upper end of the ½ to 2 hour range. It has been found that operation substantially below the ½ hour limit is ineffective in stabilizing the plasticizer, whereas operations conducted for more than 2 hours produce some loss of oxirane oxygen in the plasticizer.

The following examples are included by way of illustration of the process of the present invention, and should not be construed as limitative of process ingredients, conditions or modes of operation. Results obtained in the various experiments described in these examples are set forth in Table II which follows the examples.

PREPARATION OF EPOXY-CONTAINING FATTY ESTERS

*Example 1—Butyl epoxystearate.*—200.0 g. of butyl oleate (iodine #74 equivalent to 0.58 mole of ethylenic unsaturation) was weighed into a three-neck flask equipped with a reflux condenser, thermometer and mechanical stirrer. 40.0 g. of benzene and 18.4 g. of glacial acetic acid (0.306 mole) were added to the butyl oleate and the mixture warmed to 50° C. 2.48 g. of 50% $H_2SO_4$ then was added. Following this, 43.56 g. of 50% $H_2O_2$ (0.64 mole) were added over a period of two hours. The temperature was then raised to 60° C. and controlled between 60° C. and 65° C. until the reaction was complete as determined by periodic titrations of reaction mixture for unreacted $H_2O_2$. Approximately 5 to 10% remained unreacted at the end of 12 to 14 hours.

The reaction mixture then was poured into a separatory funnel and the aqueous layer drawn off. The oil layer was washed with successive portions of warm water (40 to 45° C.), until acetic acid free. The benzene and traces of water were then removed in a vacuum stripping column at 60° to 70° C. and 5 to 10 mm. The clear pale yellow oil was analyzed and found to contain: Percent oxirane oxygen—3.80 (theoretical 4.49). Iodine number—5.4

*Example 2.—Epoxy soybean oil.*—400.0 g. of soybean oil (iodine #135 equivalent to 2.12 moles of ethylenic unsaturation), 80.0 g. of benzene, 66.0 g. of glacial acetic acid (1.10 moles) and 2.14 g. of 96% $H_2SO_4$ were mixed in a three-neck flask equipped with a reflux condenser, thermometer and mechanical stirrer. 149.76 g. of 50% $H_2O_2$ (2.2 moles) were slowly added to the above over a period of 1.2 hours at 20° C. The reaction mixture was warmed to 60° C. and maintained at that temperature for 15 hours. The oil layer was washed and stripped of benzene and water as described in Example 1. The isolated product on analysis was found to contain: Percent oxirane oxygen — 5.9 (theoretical 7.8). Iodine number—9.2.

*Example 3—Hexyl epoxytallate.*—195.0 g. of hexyl "tallate" (hexyl ester of tall oil fatty acids) (iodine #100 equivalent to 0.77 mole of ethylenic unsaturation) was weighed into a three-neck flask equipped with a reflux condenser, thermometer and mechanical stirrer. 40.0 g. of benzene and 23.0 g. of glacial acetic acid (0.38 mole) were added to the hexyl "tallate" and the mixture warmed to 50° C. Following this, 3.2 g. of 50% $H_2SO_4$ was added to the mixture. 57.4 g. of 50% $H_2O_2$ (0.84 mole) then was added over a period of two hours. The temperature was then raised to 60° C. and controlled between 60° C. and 65° C. until the reaction was complete as determined by periodic titrations of reaction mixture for unreacted $H_2O_2$. Approximately 5 to 10% remained unrected at the end of 12 to 14 hours.

The reaction mixture was poured into a separatory funnel and the aqueous layer drawn off. The oil layer was washed with successive portions of warm water (40° to 45° C.), until acetic acid free. The benzene and traces of water were removed in a vacuum stripping column at 60 to 70° C. and 5 to 10 mm. The clear pale yellow oil was analyzed and found to contain: Percent oxirane oxygen—4.4 (theoretical 5.9). Iodine number—5.7.

AQUEOUS ALKALI TREATMENT 50 g. of each of the butyl epoxystearate of Example 1 and the epoxy soybean oil of Example 2 were placed in individual 250 ml. beakers, and agitated with mechanical stirrers. The samples then were treated further as described in Examples 4 and 5, which follow.

*Example 4.*—The butyl epoxystearate sample was heated to 60° C., and 10 g. of a 10% sodium hydroxide solution was added to it with stirring over a period of 5 minutes. The resulting mixture was stirred and maintained at this temperature for an additional 2 hours, following which the mixture was separated into oil and water layers in a separatory funnel, washed free of alkali, and dried with sodium sulfate.

*Example 5.*—The sample of epoxy soybean oil was treated according to the conditions described in Example 4, except that the sodium hydroxide solution and the oil were mixed while the oil was at a temperature of 60° C.

NON-AQUEOUS ALKALI TREATMENT

The alkalies employed in the following examples were ground with a mortar and pestle to provide particles of alkali having particle sizes of less than 0.125" in diameter. They then were stirred with the designated esters under the conditions of time and temperature set forth in Table I, which follows. Following the described treatment, the samples were filtered to remove the alkali particles, washed with water to remove any remaining small amounts of the alkali, and dried with sodium sulfate.

occurs through interaction of sulfuric acid-ester adducts, with epoxy groups in adjacent ester molecules. This interaction causes darkening of the plasticizer, bonding between the ester molecules and therefore increase in the viscosity of the plasticizer, and also loss of epoxy oxygen. These results are all serious. It is important that plasticizers for polyvinyl resins have as nearly as possible a water-white color, that they retain their fluidity and Table I

| Example | Epoxyester | Preparation | Stabilizing agent | Percent agent on ester | Treatment Time, hrs. | Treatment Temp., °C. | Misc. |
|---|---|---|---|---|---|---|---|
| 4 | butyl epoxystearate | Ex. 1 | Aqueous NaOH | 2 | 2 | 60 | |
| 5 | epoxy soybean oil | Ex. 2 | do | 2 | 2 | 60 | |
| 6 | butyl epoxystearate | Ex. 1 | Dry Ca(OH)₂ | 1 | 0.5 | 60 | |
| 7 | do | Ex. 1 | Dry Ba(OH)₂·8H₂O | 1 | 0.5 | 60 | |
| 8 | do | Ex. 1 | Dry KOH | 1 | 0.5 | 60 | |
| 9 | do | Ex. 1 | Dry NaOH | 1 | 0.5 | 60 | |
| 10 | hexyl epoxytallate | Ex. 3 | Dry Ca(OH)₂ | 2 | 0.5 | 60 | |
| 11 | epoxy soybean oil | Ex. 2 | do | 5 | 2 | 70 | In 20% heptane. |
| 12 | do | Ex. 2 | do | 5 | 1 | 50 | In 20% benzene. |
| 13 | do | Ex. 2 | do | 5 | 2 | 80 | Do. |
| 14 | do | Ex. 2 | Dry Ba(OH)₂·8H₂O | 5 | 2 | 80 | Do. |

HEAT STABILITIES

Each of the products of Examples 1–14 was heated for 16 hours in an open beaker in an oven maintained at 165° C., and evaluated with the results shown in Table II.

therefore their compatibility with and ease of blending with the polyvinyl resins, and further that they not suffer loss of oxirane oxygen.

It is not apparent why the alkalies when employed in

Table II

| Sample | Material | Preparation | Percent epoxy[1] Initial | Percent epoxy[1] After heating | Color Initial | Color After heating | Comments |
|---|---|---|---|---|---|---|---|
| 1 | butyl epoxystearate | Ex. 1 | 3.8 | 0 | water-straw | dark red-brown | Marked viscosity increase on heating. |
| 2 | epoxy soybean oil | Ex. 2 | 5.9 | 0 | do | do | Gelled on heating. |
| 3 | hexyl epoxytallate | Ex. 3 | 4.4 | 0 | do | do | Marked viscosity increase on heating. |
| 4 | butyl epoxystearate | Ex. 1 | 3.8 | 0.4 | do | amber | Moderate viscosity increase on heating. |
| 5 | epoxy soybean oil | Ex. 2 | 5.9 | 0 | do | dark amber | Gelled on heating. |
| 6 | butyl epoxystearate | Ex. 1 | 3.8 | 3.5 | do | straw | No change in viscosity. |
| 7 | do | Ex. 1 | 3.8 | 3.6 | do | do | Do. |
| 8 | do | Ex. 1 | 3.8 | 3.7 | do | do | Do. |
| 9 | do | Ex. 1 | 3.8 | 3.7 | do | do | Do. |
| 10 | hexyl epoxytallate | Ex. 3 | 4.4 | 3.8 | do | do | Do. |
| 11 | epoxy soybean oil | Ex. 2 | 5.9 | 5.2 | do | do | Do. |
| 12 | do | Ex. 2 | 5.9 | 5.5 | do | do | Do. |
| 13 | do | Ex. 2 | 5.9 | 5.5 | do | do | Do. |
| 14 | do | Ex. 2 | 5.9 | 5.5 | do | do | Do. |

[1] Analyzed by method of Swern et al., Analytical Chemistry 19, 414 (1947).

The data appearing in the above tables illustrate the effectiveness of the present stabilization method. Samples 1, 2 and 3 illustrate the degradation which plasticizers of U.S. Patent No. 2,801,253 undergo upon being exposed to a temperature of 165° C. for 16 hours. Samples 4 and 5 show the substantial ineffectiveness of treating these plasticizers with aqueous solutions of alkalies. Samples 6 to 14 show that the same plasticizers, and other similar ones, treated with solid, particulate alkalies according to the present process, exhibit excellent resistance to degradation upon exposure to the above time and temperature conditions.

The present method has been described with reference to epoxidized higher fatty ester plasticizers which have been epoxidized by peracetic acid formed in situ in the presence of sulfuric acid. However, the critical feature herein is the use of sulfuric acid as the in situ peracid formation catalyst, and plasticizers of the present type prepared from other aliphatic peracids formed in situ from the corresponding aliphatic acid and hydrogen peroxide in the presence of sulfuric acid can be treated according to the present process, with the noted advantageous effect.

It is believed that degradation of the epoxidized esters solid, particular form, effect excellent stabilization of the plasticizers, whereas the same alkalies employed in the form of aqueous solutions do not. Regardless of the reasons for the effectiveness of the present process, however, as shown hereinabove it is clear and readily demonstrated.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. Method of stabilizing an epoxy fatty ester plasticizer against degradation upon exposure to elevated temperatures, said plasticizer having been prepared by sulfuric acid catalyzed in situ peracetic acid expoxidation of an ester of a higher unsaturated fatty acid and a saturated aliphatic hydroxy compound, which method comprises heating said plasticizer at about 30°–100° C. in the substantial absence of water and in the presence of a solid particulate alkali from the group consisting of the hydroxides of sodium, potassium, calcium and barium.

2. Method of stabilizing an epoxy fatty ester plasticizer against degradation upon exposure to elevated temperatures, said plasticizer having been prepared by sulfuric acid catalyzed in situ peracetic acid epoxidation of an ester of a higher unsaturated fatty acid and a saturated aliphatic hydroxy compound, which method comprises heating said plasticizer for about ½ to 2 hours at about 30°–100° C. in the substantial absence of water and in the presence of about 1–5% by weight on the weight of said plasticizer of a solid particulate alkali from the group consisting of the hydroxides of sodium, potassium, calcium and barium.

3. Method of stabilizing an epoxy fatty ester plasticizer against degradation upon exposure to elevated temperatures, said plasticizer having been prepared by sulfuric acid catalyzed in situ peracetic acid epoxidation of an ester of a higher unsaturated fatty acid and a saturated aliphatic hydroxy compound, which method comprises heating said plasticizer for about ½ to 2 hours at about 30°–100° C. in the substantial absence of water and in the presence of about 1–5% by weight on the weight of said plasticizer of solid, particulate sodium hydroxide.

4. Method of stabilizing an epoxy fatty ester plasticizer against degradation upon exposure to elevated temperatures, said plasticizer having been prepared by sulfuric acid catalyzed in situ peracetic acid epoxidation of an ester of a higher unsaturated fatty acid and a saturated aliphatic hydroxy compound, which method comprises heating said plasticizer for about ½ to 2 hours at about 30°–100° C. in the substantial absence of water and in the presence of about 1–5% by weight on the weight of said plasticizer of solid particulate potassium hydroxide.

5. Method of stabilizing an epoxy fatty ester plasticizer against degradation upon exposure to elevated temperatures, said plasticizer having been prepared by sulfuric acid catalyzed in situ peracetic acid epoxidation of an ester of a higher unsaturated fatty acid and a saturated aliphatic hydroxy compound, which method comprises heating said plasticizer for about ½ to 2 hours at about 30°–100° C. in the substantial absence of water and in the presence of about 1–5% by weight on the weight of said plasticizer of solid particulate calcium hydroxide.

6. Method of stabilizing an epoxy fatty ester plasticizer against degradation upon exposure to elevated temperatures, said plasticizer having been prepared by sulfuric acid catalyzed in situ peracetic acid epoxidation of an ester of a higher unsaturated fatty acid and a saturated aliphatic hydroxy compound, which method comprises heating said plasticizer for about ½ to 2 hours at about 30°–100° C. in the substantial absence of water and in the presence of about 1–5% by weight on the weight of said plasticizer of solid particulate barium hydroxide.

7. Plasticizer stabilized according to the method of claim 2.

References Cited in the file of this patent

UNITED STATES PATENTS 2,801,253     Greenspan _____ July 30, 1957